US 7,089,125 B2

(12) United States Patent
Sonderegger

(10) Patent No.: US 7,089,125 B2
(45) Date of Patent: Aug. 8, 2006

(54) DISTRIBUTED ASSET OPTIMIZATION (DAO) SYSTEM AND METHOD

(75) Inventor: Robert C. Sonderegger, Berkeley, CA (US)

(73) Assignee: Itron, Inc., Spokane, WA (US)

( * ) Notice: Subject to any disclaimer, the term of this patent is extended or adjusted under 35 U.S.C. 154(b) by 9 days.

(21) Appl. No.: 10/976,103

(22) Filed: Oct. 27, 2004

(65) Prior Publication Data

US 2005/0090995 A1    Apr. 28, 2005

Related U.S. Application Data

(60) Provisional application No. 60/514,947, filed on Oct. 27, 2003.

(51) Int. Cl.
*G01R 15/00* (2006.01)
*G01R 21/00* (2006.01)
*G01R 21/06* (2006.01)

(52) U.S. Cl. .......................... 702/57; 702/61
(58) Field of Classification Search .............. 702/1, 702/3, 57, 60, 61; 340/870.01, 870.02; 703/4, 703/13, 21

See application file for complete search history.

(56) References Cited

U.S. PATENT DOCUMENTS

2004/0113810 A1 * 6/2004 Mason et al. .......... 340/870.02
2005/0270173 A1 * 12/2005 Boaz .................... 340/870.02

* cited by examiner

*Primary Examiner*—Michael Nghiem
(74) *Attorney, Agent, or Firm*—DLA Piper Rudnick Gray Cary US LLP

(57) ABSTRACT

A method of determining an energy load on a power distribution component, and a system for storing such method are presented. The method entails collecting meter data (in various formats) and weather data. The meter data and the weather data are correlated to generate tuning equations, each of which is associated with at least one of the meters and indicates a weather sensitivity of that meter. Any meter data that is in the hourly or daily format are normalized to generate normalized hourly loadshapes that are independent of weather conditions and weekly variations. These normalized hourly loadshapes are combined with the tuning equations to generate a set of model coefficients for each of the meters. The set of model coefficients reflects weather conditions and weekly variations for one of the meters, and is useful for determining an energy load on the power distribution component.

50 Claims, 14 Drawing Sheets

| | EndDate | SumEng(kWh) |
|---|---|---|
| ✓ | 01/31/2001 | 113584 |
| ✓ | 02/28/2001 | 101864 |
| ✓ | 03/31/2001 | 107347 |
| ✓ | 04/30/2001 | 100937 |
| ✓ | 05/31/2001 | 111035 |
| ✓ | 06/30/2001 | 118417 |
| ✓ | 07/31/2001 | 130032 |
| ✓ | 08/31/2001 | 133807 |
| ✓ | 09/30/2001 | 110077 |
| ✓ | 10/31/2001 | 105413 |
| ✓ | 11/30/2001 | 104387 |
| ✓ | 12/31/2001 | 102825 |

$kWh = 3312.2 \cdot DAYS + 42.0 \cdot CDD(54°F) + 14.36 \cdot HDD(38°F)$

FIG. 9A

TRANSFORMER LOAD REPORT                                              itron

LOCATION COORDINATES

REPORT PARAMETERS:
STATE(S): MN - MINNESOTA
DIVISION(S): DIV 340 - DIVISION340
SUBSTATION(S): SUBSTATION AIRPORT1 15/13.8kV, SUBSTATION EDEN PRAIRIE1 18/13kV
BANK(S): ALL BELOW
FEEDER(S): ALL BELOW
TRANSFORMER(S): ALL BELOW
LOADED >=0% AND <=30%, TYPE = ALL BELOW, VOLTAGE = ALL BELOW, NAMEPLATE RATING = ALL BELOW
TIME PERIOD - JUNE 2002

NOTE TRANSFORMERS LOADED OVER 100%

| Transformer | N/S | E/W | O/U | VOLTAGE | %R | %C | %I | #SVC | #SHT | #SSW | PH | RATING | MAX/MIN KW | MAX/MIN TIME | MAX/MIN TEMP | PF MAX | %I MAX |
|---|---|---|---|---|---|---|---|---|---|---|---|---|---|---|---|---|---|
| M708 L02 | 1630940 | 1579981 | U | 277/480 | 0 | 0 | 100 | 1 | 0 | 0 | ABC | 225.00 | 341.08 45.55 | 6/22/02 2:00 6/3/02 5:00 | 69.00 53.60 | 0.90 | 168.43 |
| M708 Q04 | -999 | -999 | UNL | UNKNOWN | 0 | 0 | 100 | 1 | 0 | 0 | ABC | 750.00 | 347.95 166.34 | 6/25/02 17:00 6/16/02 7:00 | 88.00 57.20 | 0.90 | 51.55 |
| M708 R04 | -999 | -999 | UNL | UNKNOWN | 0 | 50 | 50 | 2 | 0 | 0 | ABC | 500.00 | 168.19 38.24 | 6/25/02 17:00 6/3/02 1:00 | 88.00 54.00 | 0.90 | 37.38 |
| M708 T08 | 1630928 | 1581175 | U | 277/480 | 0 | 100 | 0 | 1 | 0 | 0 | ABC | 300.00 | 66.46 4.13 | 6/4/02 10:00 6/25/02 0:00 | 50.00 75.00 | 0.95 | 23.32 |
| M718 N04 | 1630838 | 1580622 | U | 120/208 | 0 | 0 | 100 | 1 | 0 | 0 | ABC | 225.00 | 89.86 38.56 | 6/25/02 13:00 6/16/02 8:00 | 83.00 60.80 | 0.90 | 44.37 |
| M718 N05 | 1630841 | 1580532 | U | 120/240 | 0 | 100 | 0 | 1 | 0 | 0 | A | 25.00 | 17.19 0.80 | 6/15/02 13:00 6/24/02 4:00 | 70.00 77.00 | 0.95 | 72.37 |
| M718 T03 | -999 | -999 | UNL | UNKNOWN | 0 | 100 | 0 | 2 | 0 | 0 | ABC | 75.00 | 1.90 0.02 | 6/11/02 9:00 6/24/02 4:00 | 64.00 77.00 | 0.95 | 2.66 |
| M719 K01 | 1630797 | 1582577 | U | 120/208 | 0 | 0 | 100 | 1 | 0 | 0 | ABC | 112.00 | 101.14 1.59 | 6/9/02 7:00 6/3/02 7:00 | 88.00 53.60 | 0.95 | 95.05 |
| N721 R02 | -999 | -999 | UNL | UNKNOWN | 0 | 0 | 100 | 2 | 0 | 0 | ABC | 112.00 | 0.00 0.00 | 10/5/02 1:00 9/29/02 1:00 | 88.00 1.40 | 0.95 | 0.00 |
| M57059T04 | -999 | -999 | UNL | UNKNOWN | 0 | 0 | 100 | 1 | 0 | 0 | ABC | 750.00 | 662.64 134.62 | 6/30/02 9:00 6/5/02 10:00 | 82.00 64.00 | 0.90 | 98.17 |
| M57069T10 | -999 | -999 | UNL | UNKNOWN | 0 | 66 | 33 | 3 | 0 | 0 | A | 25.00 | 67.45 27.31 | 6/17/02 14:00 6/4/02 0:00 | 69.80 54.00 | 0.90 | 299.63 |
| M778 S04 | 1628778 | 1581182 | U | 120/208 | 0 | 0 | 100 | 1 | 0 | 0 | ABC | 300.00 | 320.78 10.86 | 6/1/02 8:00 6/3/02 2:00 | 71.00 53.60 | 0.90 | 118.81 |

TRANSFORMER OVERLOAD REPORT

REPORT PARAMETERS  
STATE(S): MN - MINNESOTA  
DIVISION(S): DIV_340 - DIVISION340  
SUBSTATION(S): SUBSTATION EDINA1 15/13.8KV  
BANK(S): ALL BELOW  
FEEDER(S): ALL BELOW  
TRANSFORMER(S): ALL BELOW  
OVERLOADED >=100% AND <=300%, TYPE = ALL BELOW, VOLTAGE = ALL BELOW, NAMEPLATE TING = ALL BELOW  
TIME PERIOD - JULY 2002

| Transformer | M/S | E/W | O/I | VOLTAGE | PH | RATING | MAX/MIN KW | MAX/MIN TIME | MAX/MIN TP | PF MAX | %L MAX | #OV H | #OV E | # OV D | AVG O/D |
|---|---|---|---|---|---|---|---|---|---|---|---|---|---|---|---|
| L773 R03 | -999 | -999 | UNL | UNKNOWN | A | 25.00 | 29.52 11.11 | 7/1/02 19:00 7/9/02 1:00 | 89.00 73.00 | 0.95 | 124.29 | 7 | 2 | 1 | 7 |
| L783 N01 | -999 | -999 | UNL | UNKNOWN | A | 25.00 | 37.62 7.38 | 7/1/02 20:00 7/2/02 13:00 | 87.00 82.00 | 0.95 | 158.41 | 17 | 5 | 1 | 17 |
| L783 Q01 | -999 | -999 | UNL | UNKNOWN | B | 37.00 | 39.51 15.12 | 7/6/02 13:00 7/28/02 1:00 | 89.00 72.00 | 0.95 | 112.39 | 4 | 2 | 1 | 4 |
| L783 T05 | -999 | -999 | UNL | UNKNOWN | A | 25.00 | 25.95 12.22 | 7/1/02 19:00 7/7/02 5:00 | 89.00 72.00 | 0.95 | 109.26 | 2 | 2 | 1 | 2 |
| L783 U01 | 1629534 | 1541437 | U | 120/240 | B | 25.00 | 28.46 12.76 | 7/1/02 19:00 7/7/02 7:00 | 89.00 73.80 | 0.95 | 119.82 | 8 | 4 | 1 | 8 |
| L783 V02 | -999 | -999 | UNL | UNKNOWN | B | 25.00 | 29.33 11.13 | 7/1/02 19:00 7/28/02 5:00 | 89.00 72.00 | 0.95 | 123.51 | 6 | 3 | 1 | 6 |
| L784 C01 | -999 | -999 | UNL | UNKNOWN | C | 25.00 | 25.26 13.27 | 7/21/02 14:00 7/21/02 7:00 | 90.00 78.00 | 0.95 | 106.34 | 1 | 1 | 1 | 1 |
| L784 E02 | 1629636 | 1542977 | U | 120/240 | B | 37.00 | 36.63 21.59 | 7/1/02 20:00 7/1/02 3:00 | 87.00 80.00 | 0.95 | 104.21 | 3 | 1 | 1 | 3 |
| L784 G01 | 1629521 | 1542596 | U | 120/240 | C | 25.00 | 28.92 12.49 | 7/1/02 19:00 7/6/02 1:00 | 89.00 73.00 | 0.95 | 121.77 | 7 | 4 | 1 | 7 |
| L784 G02 | -999 | -999 | UNL | UNKNOWN | C | 25.00 | 33.55 10.74 | 7/21/02 14:00 7/14/02 6:00 | 90.00 62.00 | 0.95 | 141.25 | 12 | 3 | 1 | 12 |
| L784 H01 | 1629498 | 1542829 | U | 120/240 | C | 37.00 | 35.69 21.92 | 7/1/02 19:00 7/1/02 3:00 | 89.00 80.00 | 0.95 | 101.53 | 1 | 1 | 1 | 1 |
| L784 K02 | -999 | -999 | UNL | UNKNOWN | B | 25.00 | 28.26 13.07 | 7/21/02 13:00 7/6/02 1:00 | 88.00 73.00 | 0.95 | 118.99 | 5 | 3 | 1 | 5 |
| L784 K04 | 1629593 | 1543575 | U | 120/240 | B | 37.00 | 42.23 16.84 | 7/6/02 13:00 7/9/02 5:00 | 89.00 70.00 | 0.95 | 120.14 | 10 | 2 | 1 | 10 |
| L784 L01 | -999 | -999 | UNL | UNKNOWN | A | 37.00 | 37.50 20.05 | 7/1/02 13:00 7/1/02 3:00 | 89.00 80.00 | 0.95 | 106.69 | 4 | 2 | 1 | 4 |
| L784 N01 | 1629632 | 1543813 | U | 120/240 | B | 37.00 | 49.92 11.39 | 7/1/02 20:00 7/30/02 1:00 | 87.00 71.00 | 0.95 | 142.03 | 13 | 5 | 1 | 13 |

FIG. 9B

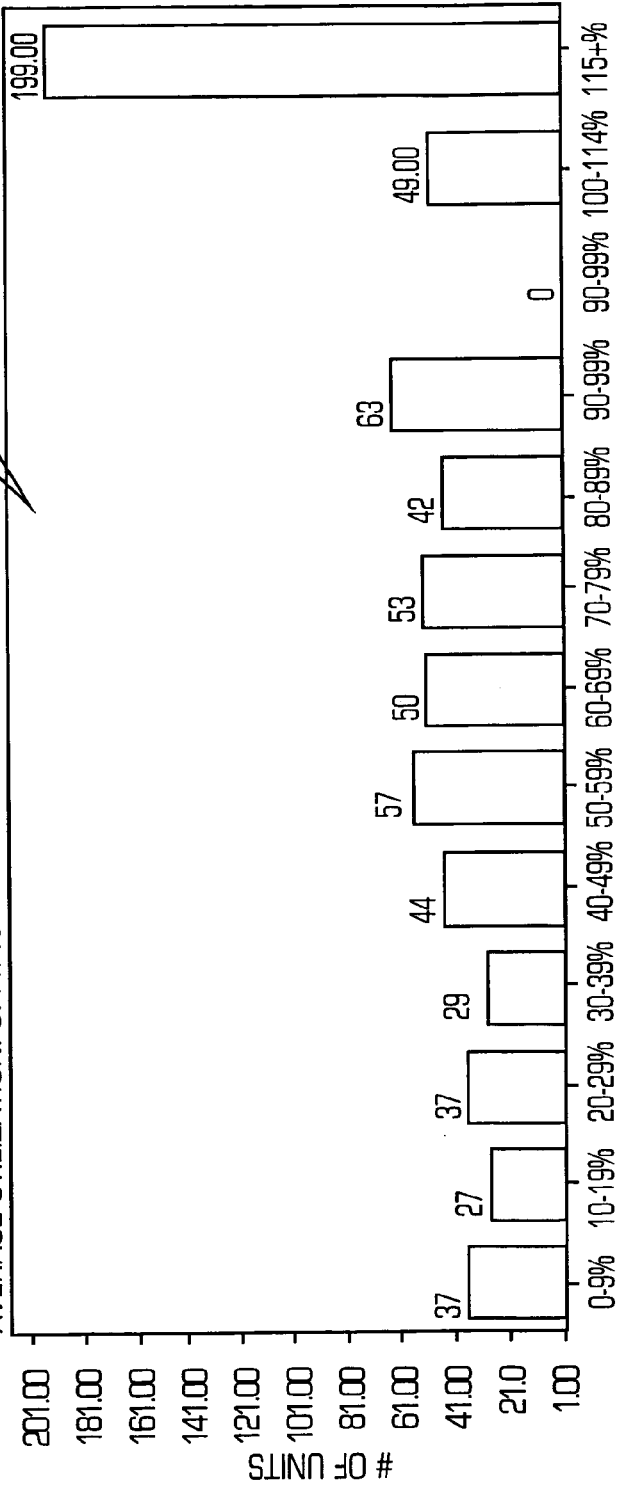

FEEDER LOAD REPORT

REPORT PARAMETERS:  STATE(S): MN - MINNESOTA
DIVISION(S): DIV 340 - DIVISION340
SUBSTATION(S): SUBSTATION EDEN PRAIRIE 118/13.8kV
BANK(S): ALL BELOW
FEEDER(S): ALL BELOW
LOADED >=0% AND <=300%
TIME PERIOD - JULY 2002

| FEEDER | AMP RTG | %R | %C | %I | #SVC | #SHT | #SSW | MAX/MIN AMPS | | MAX/MIN TIME | | MAX/MIN TEMP | | A | B | C | MAX MW | % L MAX |
|---|---|---|---|---|---|---|---|---|---|---|---|---|---|---|---|---|---|---|
| EDP061 | 434.46 | 97 | 2 | 0 | 2,475 | 45 | 0 | 600.12 | 0.83 | 7/7/02 16:00 | 7/16/02 20:00 | 89.00 | 82.00 | 0.00 | 0.00 | 0.00 | 14.54 | 138.13 |
| EDP063 | 450.55 | 86 | 10 | 3 | 596 | 2 | 0 | 633.46 | 140.03 | 7/16/02 18:00 | 7/4/02 4:00 | 87.00 | 64.00 | 0.00 | 0.00 | 0.00 | 15.44 | 140.60 |
| EDP071 | 414.35 | 35 | 50 | 14 | 111 | 0 | 0 | 310.89 | 123.36 | 7/1/02 11:00 | 7/11/02 3:00 | 86.00 | 60.00 | 0.00 | 0.00 | 0.00 | 7.56 | 75.03 |
| EDP072 | 486.76 | 78 | 19 | 1 | 557 | 1 | 0 | 268.39 | 90.02 | 7/30/02 14:00 | 7/14/02 6:00 | 91.00 | 62.00 | 0.00 | 0.00 | 0.00 | 6.56 | 55.14 |
| EDP073 | 410.32 | 81 | 17 | 0 | 1,724 | 7 | 0 | 610.95 | 63.35 | 7/11/02 20:00 | 7/3/02 11:00 | 87.00 | 81.00 | 0.00 | 0.00 | 0.00 | 14.76 | 148.89 |
| EDP081 | 514.92 | 58 | 34 | 6 | 239 | 0 | 0 | 219.21 | 80.02 | 7/2/02 14:00 | 7/14/02 6:00 | 82.00 | 62.00 | 0.00 | 0.00 | 0.00 | 5.27 | 42.57 |
| EDP082 | 514.92 | 0 | 87 | 12 | 123 | 0 | 0 | 386.74 | 83.35 | 7/5/02 15:00 | 7/4/02 2:00 | 81.00 | 69.00 | 0.00 | 0.00 | 0.00 | 9.47 | 75.11 |
| EDP083 | 514.92 | 89 | 9 | 1 | 534 | 2 | 0 | 226.71 | 65.01 | 7/5/02 11:00 | 7/14/02 6:00 | 74.00 | 62.00 | 0.00 | 0.00 | 0.00 | 5.56 | 44.03 |

NOTE FEEDERS LOADED OVER 100%

PHASE AMPS ARE POPULATED IF SCADA DATA EXISTS

FIG. 10A

FEEDER OVERLOAD REPORT

REPORT PARAMETERS  STATE(S): MN - MINNESOTA
DIVISION(S): DIV 340 - DIVISION340
SUBSTATION(S): SUBSTATION AIRPORT115/18.3kV, SUBSTATION EDEN PRAIRIE 118/13.8kV
BANK(S): ALL BELOW
FEEDER(S): ALL BELOW
OVERLOADED >=100% AND <=300%
TIME PERIOD - JUNE 2002

| FEEDER | AMP RTG | %R | %C | %I | #SVC | #SHT | #SSW | MAX/MIN AMPS | | MAX/MIN TIME | | MAX/MIN TEMP | | A | B | C | %L MAX | OV H | OV E | OV D | AVG O/D |
|---|---|---|---|---|---|---|---|---|---|---|---|---|---|---|---|---|---|---|---|---|---|
| AIR074 | 458.60 | 0 | 27 | 72 | 29 | 0 | 0 | 526.95 | 375.00 | 6/25/02 | 16:00 | 6/18/02 | 3:00 | 88.00 | 62.60 | 505.86 | 514.84 | 526.95 | 114.90 | 16 | 1 | 1 | 16 |
| EDP061 | 434.46 | 97 | 2 | 0 | 2,475 | 45 | 0 | 548.44 | 161.70 | 6/9/02 | 17:00 | 6/30/02 | 6:00 | 85.00 | 77.00 | 0.00 | 0.00 | 0.00 | 126.23 | 8 | 1 | 1 | 8 |
| EDP073 | 410.32 | 81 | 17 | 0 | 1,724 | 7 | 0 | 541.77 | 93.35 | 6/29/02 | 18:00 | 6/27/02 | 4:00 | 91.00 | 68.00 | 0.00 | 0.00 | 0.00 | 132.03 | 12 | 1 | 1 | 12 |

OVER H    NUMBER OF OVERLOAD HOURS
OVER E    NUMBER OF OVERLOAD EVENTS
OVER D    NUMBER OF OVERLOAD DAYS
AVG O/DAY    AVERAGE OVERLOAD HOURS PER OVERLOAD DAY

FIG. 10B

DISTRIBUTED ASSET OPTIMIZATION (DAO) SYSTEM AND METHOD

RELATED APPLICATIONS

This patent application claims the benefit, under 35 U.S.C. § 119(e), of U.S. Provisional Patent Application Ser. No. 60/514,947 filed on Oct. 27, 2003, the content of which is incorporated by reference herein.

FIELD OF INVENTION

The invention relates generally to energy distribution and more specifically to optimization of energy distribution.

BACKGROUND

Power is generated at power plants and distributed to customers through a network of power plants, transmission lines, substations, and distribution systems. For example, in the case illustrated in FIG. 1, power is generated at a Power Plant A 10 and a Power Plant B 12 and transmitted to a substation 14 through high-voltage transmission lines 16. The high-voltage transmission lines 16 form part of a power grid that connects power plants and substations across a wide area. At the substation 14, power is "stepped down" in voltage and eventually supplied to various end users 18 (e.g., residences and businesses) through distribution transformers 19 that are located near the end users 18. The distribution transformers 19 are organized by feeder circuits (group of power lines) that transmit power from the substation to the individual transformers 19. At least one feeder circuit comes out of each substation 14, and each feeder circuit feeds one or more transformers 19. The distribution transformers 19 step voltage down to a line voltage, which is a step down of between about 4 kV and 34 kV.

The distribution transformers are sized to comfortably meet the expected maximum peak load. Although this "oversizing" of transformers comes at a price, this price is a relatively cheap insurance against outages that can result if transformers are overloaded.

FIGS. 2A and 2B illustrate the effect of excess-capacity loading on the lifespan of a transformer. If a transformer were operated continuously at the nameplate capacity and rated ambient conditions, its typical expected lifespan is about 10–20 years. However, if a transformer load exceeds capacity even for a few hours on a few days of the year, the transformer can suddenly fail long before the expected lifespan is reached. FIG. 2A shows the temperature fluctuations between about May 2001 and August 2001, and illustrates how transformer load correlates with outdoor temperature. In late July/early August, when the temperature exceeded 80° F., the transformer load exceeded 100% of the load capacity. As shown in FIG. 2B, the consumed life of the transformer during this period increased dramatically, from about 500 hours to about 1,400 hours. Due to this sensitivity to excess loading, a transformer experiences almost all of its annual "aging" in a relatively small number of overload events.

Accelerated aging of the transformer leads to an earlier failure of the transformer, usually at an unexpected time. Typically, about 1% of transformers fail unexpectedly in a given year. While this relatively small number may appear to be an acceptable risk, the location of such failures is difficult to predict and their timing is often coincident with other problems typical for a peak day. The replacement is costly in terms of labor that must be rushed to the site as well as fines that may be levied by the PUC in some states. Failure of a transformer can also incur non-monetary costs, such negative effects on public relations.

These costs can be dramatically reduced by a reasonably accurate prediction on transformer failure. Thus, a method and system for predicting transformer failure could be extremely beneficial to various entities in the power supply chain, for example to utility companies.

SUMMARY

In one aspect, the invention is a method of determining an energy load on a power distribution component. The method entails collecting meter data for a group of meters and collecting weather data. Some of the meter data is in an hourly format and some of the meter data is in a monthly format. The meter data and the weather data are correlated to generate tuning equations, wherein each of the tuning equations is associated with at least one of the meters and indicates a weather sensitivity of that meter. The meter data that is in the hourly format is also normalized to generate normalized hourly loadshapes that are independent of weather conditions and weekly variations. These normalized hourly loadshapes are combined with the tuning equations to generate a set of model coefficients for each of the meters. The set of model coefficients reflects weather conditions and weekly variations for one of the meters, and is useful for determining an energy load on the power distribution component.

In another aspect, the invention is a computer-readable memory that instructs a computer to function in a specified manner. The memory stores instructions to collect meter data and weather data for a group of meters, instructions to correlate the meter data with the weather data to generate tuning equations, and instructions to normalize the meter data to generate normalized hourly loadshapes. Each of the tuning equations is associated with at least one meter and indicates a weather sensitivity of the meter. The normalized hourly loadshapes, on the other hand, are, independent of weather conditions and weekly variations. The memory also stores instructions to combine the tuning equations with the normalized hourly loadshapes to generate a set of model coefficients for the meter. The model coefficients reflect weather conditions and weekly variations for the meter. The memory includes instructions to store the model coefficients so that the model coefficients are retrievable to determine the power load on a power distribution component.

BRIEF DESCRIPTION OF THE FIGURES

FIGS. 9A, 9B, and 9C are exemplary reports showing transformer loads.

FIGS. 10A, 10B, and 10C are exemplary reports showing feeder loads.

DETAILED DESCRIPTION OF THE PREFERRED EMBODIMENT(S)

Embodiments of the invention are described herein in the context of power distribution and more specifically in the context of transformer failure prediction. However, it is to be understood that the embodiments provided herein are just preferred embodiments, and the scope of the invention is not limited to the applications or the embodiments disclosed herein. In fact, the method of the invention may be adapted to any context involving asset distribution, as will be apparent to a person of ordinary skill in the art.

"Transformer load profiles" refer to virtual meter kW and kVA readings for the model training period as well as for other periods for which weather data is available. "Weather data," as used herein, is a record of temperatures, cloud conditions, and precipitation level by date. A "memory system" may be any form of storage, whether it be one physical part or a plurality of separate physical parts. "Revenue class" is intended to mean the classification into residential, commercial, and industrial classes typically used by utility companies. "Rate class" is intended to mean the rate tariff classifications typically used by utility companies. As used herein, "loadfactor" is the ratio of the average power consumed during a period of time and the peak power consumed during the same period of time.

In its preferred embodiment, the invention is implemented as a software module with a plurality of instructions. The software module may reside on a computer system or, alternatively, in a computer readable medium (e.g., a CD-ROM, USB drive, flash memory) with instructions to be executed by the computer system. Due to the abundance of data that are involved in the invention, the method described herein is preferably implemented in the form of a server system.

Figure 1:
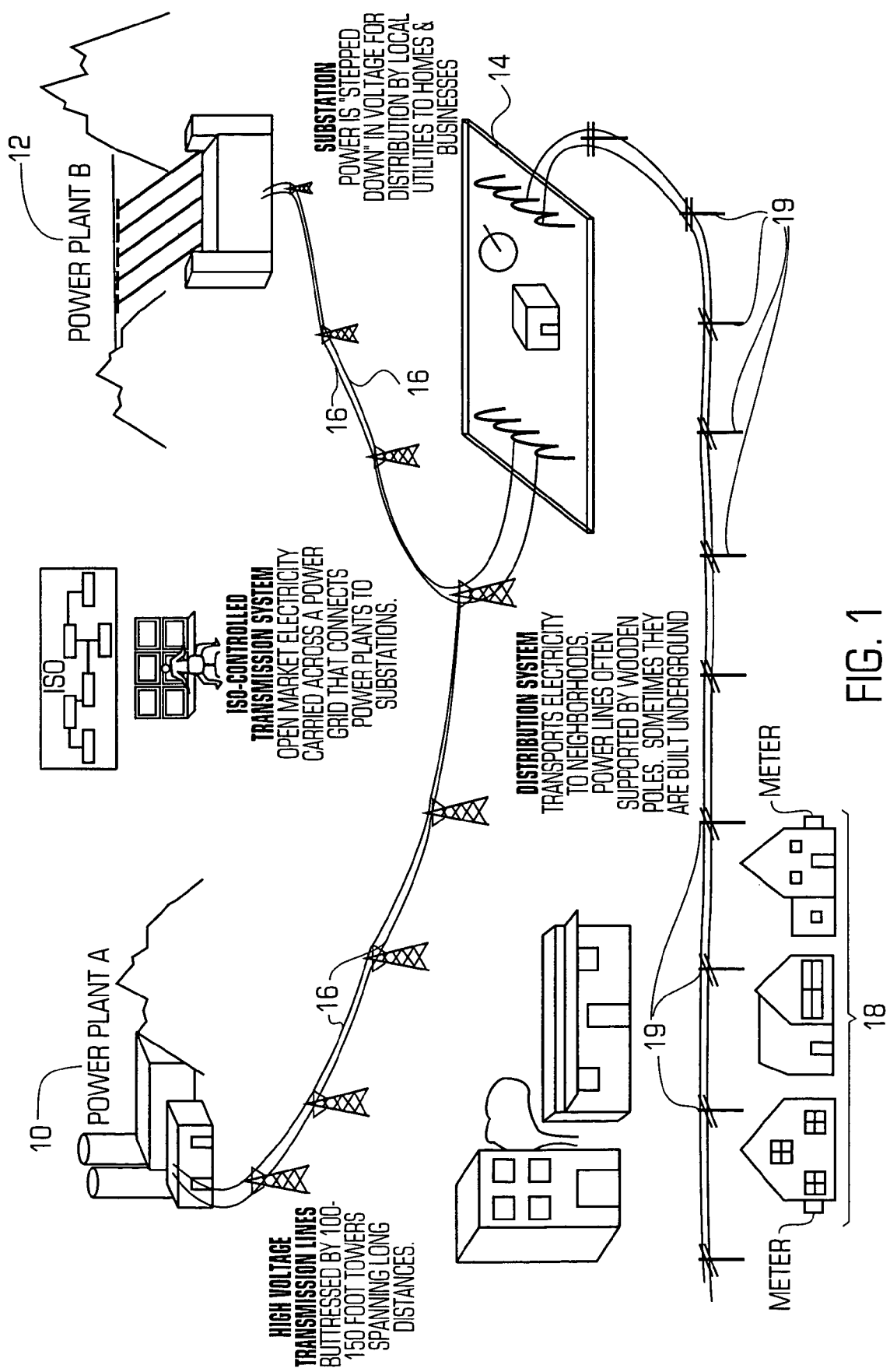
FIG. 1 is a schematic illustration of the power distribution system.
Figure 2A:
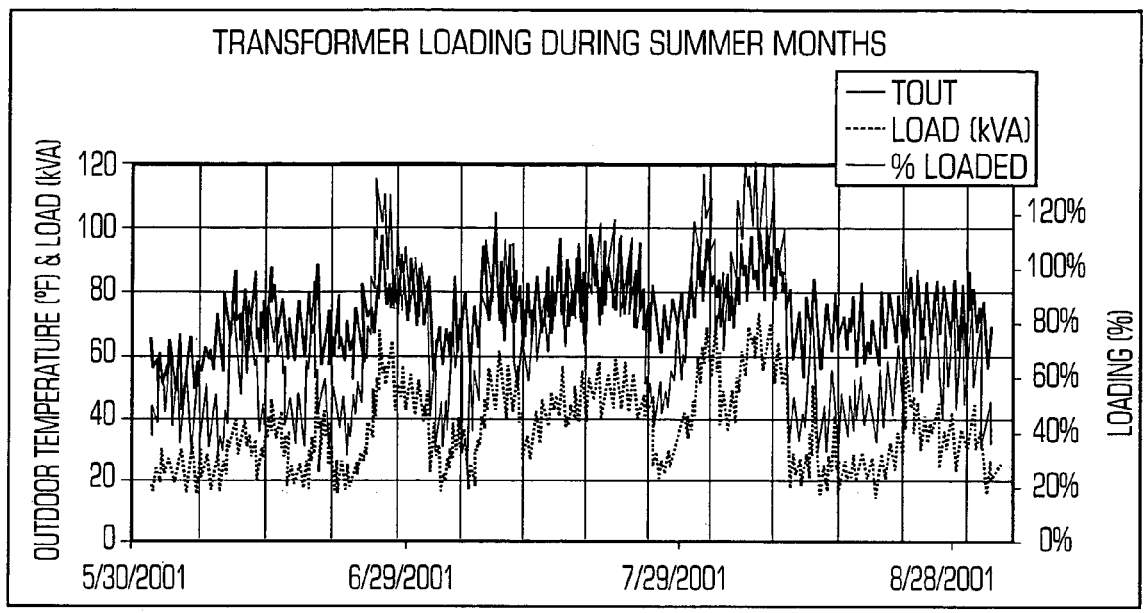
FIGS. 2A and 2B are graphical illustrations of the effect of excess-capacity loading on the lifespan of a transformer.
Figure 2B:
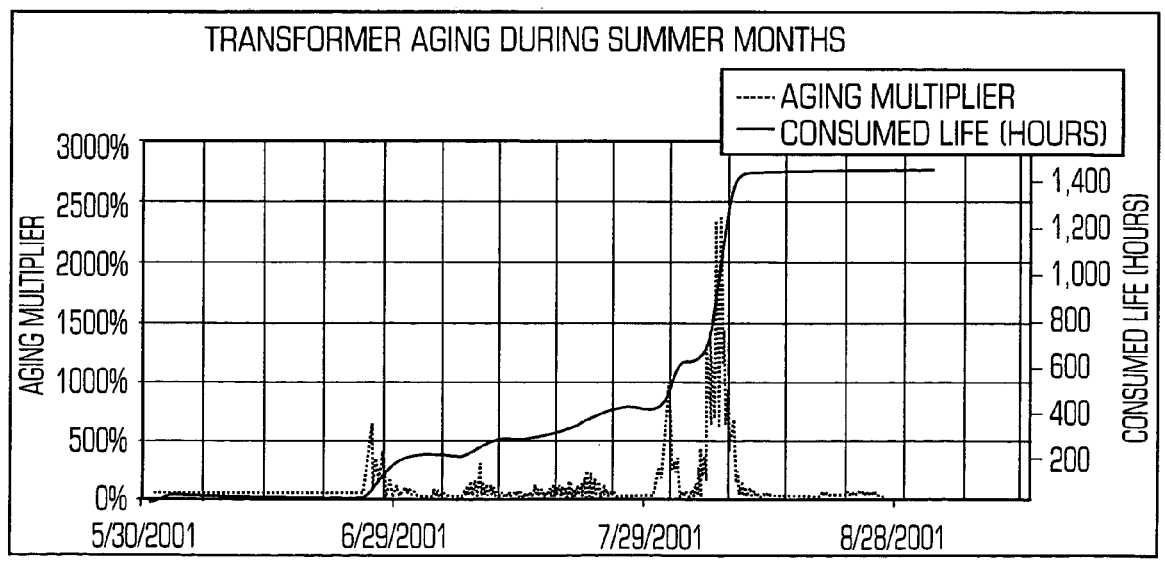
Figure 3:
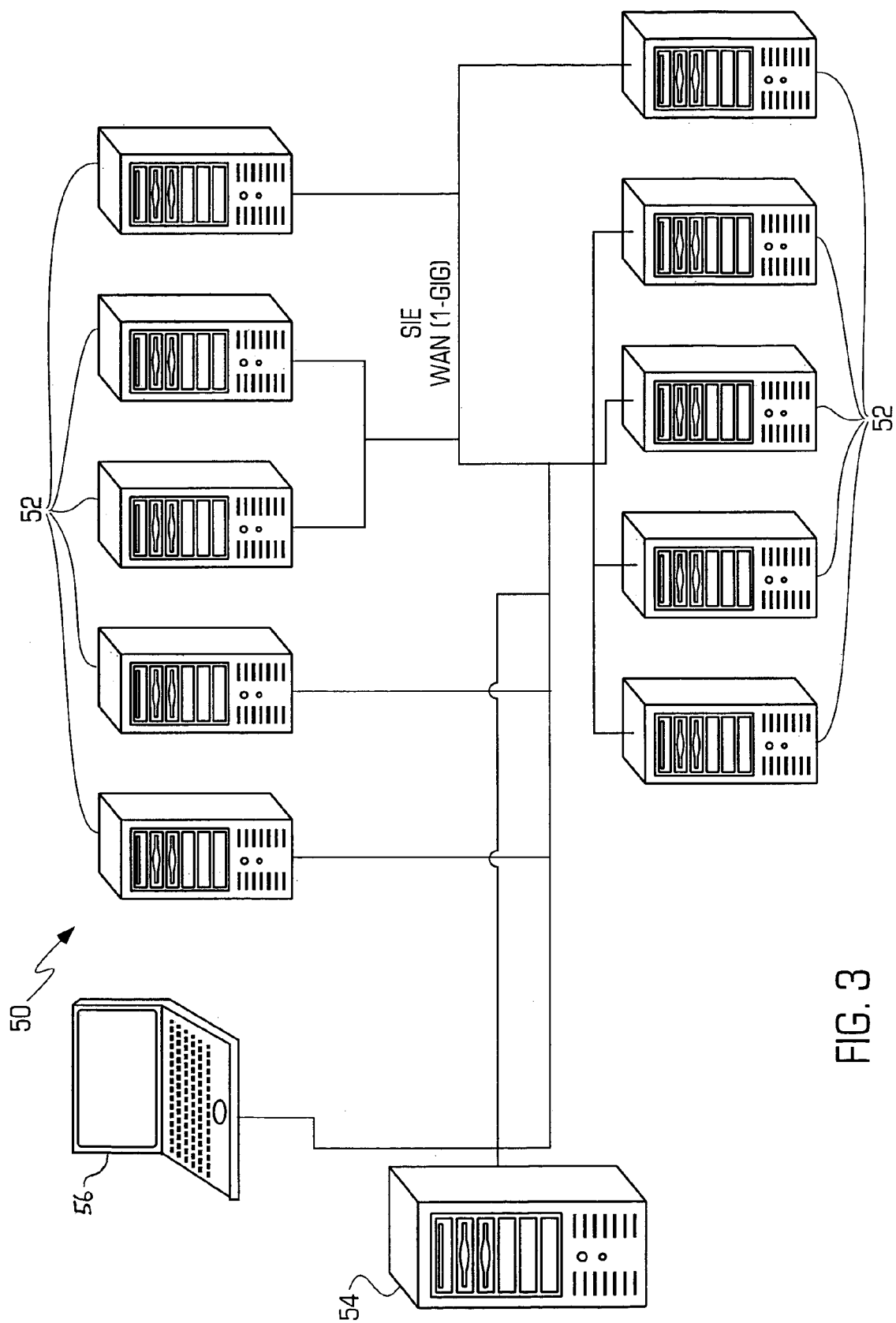
FIG. 3 is an exemplary server system that may be used to implement the invention.

FIG. 3 is an exemplary memory system 50 in accordance with one embodiment of the invention. The memory system 50 includes a plurality of analytical servers 52 and a master server 54 that manages the data required by the modeling servers 52. Each of the analytical servers 52 is connected to the master server 54 through a local area network (LAN) or any other type of high-speed connection. The analytical servers may store different parts of the total data managed by the master server 54, perhaps divided according to geographic area, transformer banks, etc. One of the analytical servers also functions as a coordinator among all analytical servers. In a preferred embodiment, the master server 54 acts as a database server and does not serve a controlling function. A client computer 56 is connected to one of the analytical servers 52 and acts as the interface between the client and the host. Using the client computer 56, a client can request reports from the analytical server 52.

In many cases, the number of end user meters is in the millions, the number of transformers is in the hundreds of thousands, and the number of feeders is in the high hundreds or low thousands. As will be explained below, the method of the invention entails generating one or more model coefficients for each end user meter. Given the large numbers of meters involved, execution of the method is a massive computational undertaking involving hundreds of statistical regressions for each of the millions of meters. The memory system 50 is able to implement a system of this scale. In the memory system 50, a loadshape library (see FIG. 4) is preferably incorporated into the master server 54, connected to a number of peripheral analytical servers 52. The arrangement shown in FIG. 3 is used to calculate model coefficients. Once calculated, the model coefficients are used by computers located at different sites (e.g., the client computer 56) to compute transformer load at times past or future and for weather conditions actual or forecast or assumed.

Figure 4:
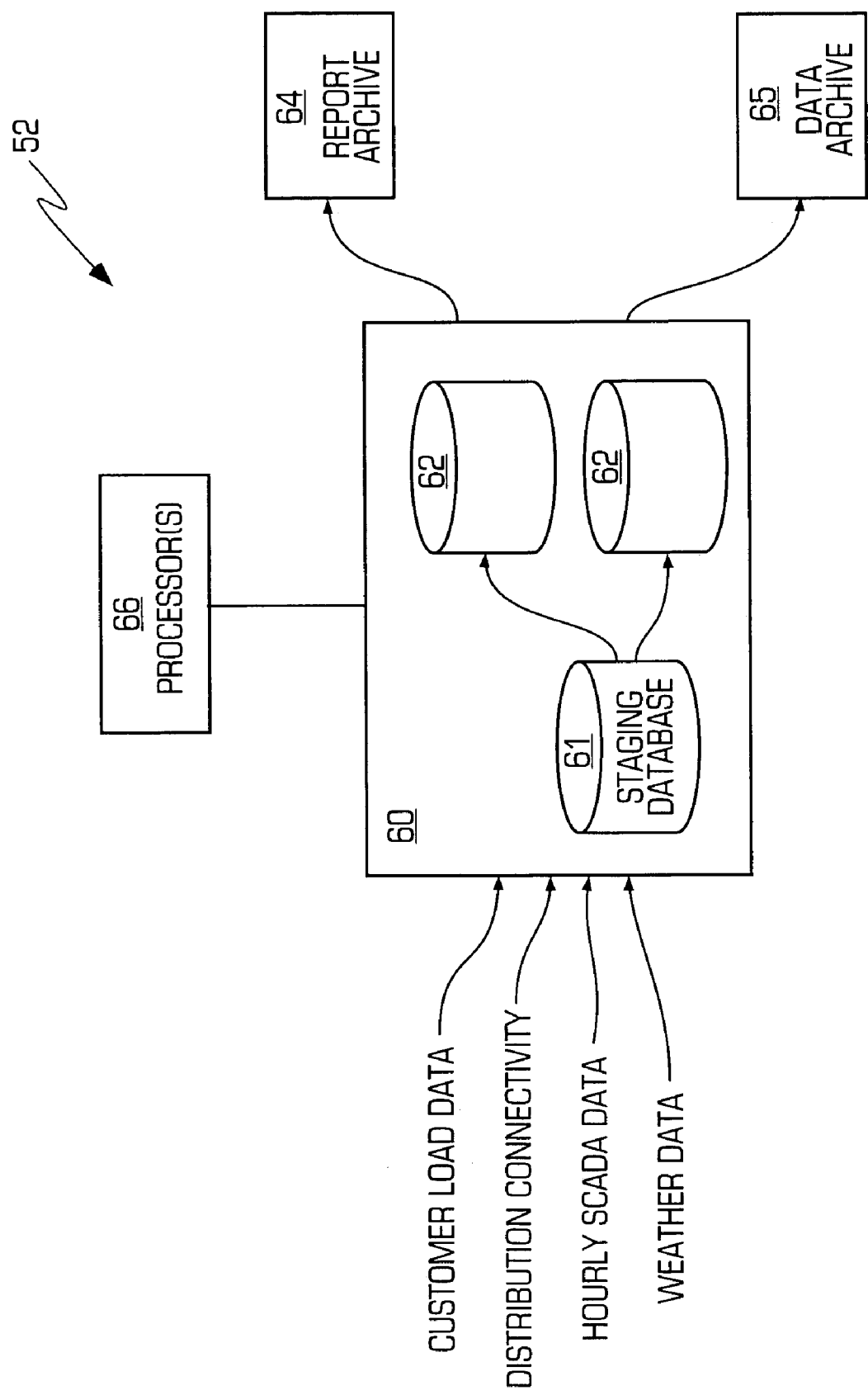
FIG. 4 is a block diagram of the server system of FIG. 3.

FIG. 4 is a block diagram of the memory system 50. Each of the analytic servers 52 includes a database 60 and at least one processor 66. The database 60 may include a staging database 61, a loadshape library 62, and a model database 63. The database 60 is configured to receive data from various sources. The data it receives includes customer load data (e.g., customer's monthly billing statement generated by utility companies), distribution connectivity maps showing how transformers, feeders, taps, and meters are connected, hourly SCADA readings, and weather data. The customer load data may be in monthly or daily interval. Some customer load data, such as load data for large industrial clients, may even be in an hourly format. A person of ordinary skill in the art would understand how to obtain the above data, as they are standard information in the industry and/or publicly available information. For example, the customer load data may be obtained from Customer Information Systems (CIS). The distribution connectivity maps may be obtained from Geographic Information System (GIS). The weather data may be obtained from National Oceanic and Atmospheric Administration (NOAA).

The processor 66 uses the distribution connectivity maps to generate "points," which are in turn used for establishing the system hierarchy. The system hierarchy is a graphical representation of the distribution connectivity maps, and shows which substations support particular feeders, which feeders provide power to certain transformers, and which meters receive power from the transformers. The system hierarchy includes nodes, and most nodes in this hierarchy have points containing values. A "point" is a time-varying value signal from a system. Point examples include transformer kW and kVA, feeder kW, kVA, PF, Amp Phase A, B, and C. Points are characterized by type, unit of measure, rate of measurement (polling interval), source, etc. Some types of points include 1) measured values, 2) rendered values, 3) calculated values, 4) aggregated values. The system hierarchy is structured to meet the reporting requirements, and it provides a mechanism/format for capturing and arranging the raw data. The system hierarchy is stored in the database 60 before any meter readings are stored, so that the readings are stored within the system hierarchy as they are received.

The processor 66 runs the modeling process 70 that is described in reference to FIG. 5 below. At the end of the modeling process 70, there is a set of model coefficients assigned to each meter in the coverage area, and these model coefficients are used to render models in response to client requests. The data from the database 60, including the model coefficients, may be formatted into packaged standard reports and stored in a standard report archive 64. Also, the data may be stored in a data archive 65 according to the system hierarchy so that they may be used later to generate custom reports in response to requests from the client computers 56.

The method of the invention relies on some assumptions. One assumption is that over a time interval of at least one hour, all electrical energy that is fed into a substation circuit is equal to the total energy consumed by end user meters supplied by this feeder circuit, excluding any line loss, transformer loss, or unmetered power usage. Another assumption is that each end user meter whose power is supplied by a feeder is connected to one distribution transformer, and that each distribution transformer connected to the feeder provides power to one or more customer meters. Yet another assumption is that a substantial fraction of customer meters are either revenue meters, load research meters, or other metering devices whose data is permanently stored and available for analysis.

Figure 5:
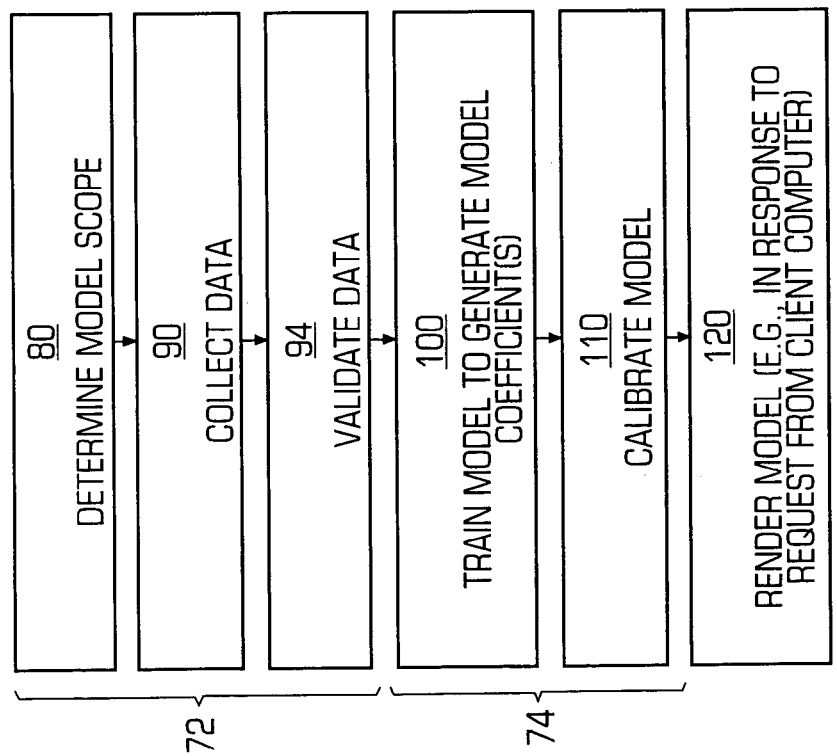
FIG. 5 is a flowchart of a modeling process in accordance with an embodiment of the invention

FIG. 5 is a flowchart of a modeling process 70 in accordance with an embodiment of the invention. The modeling process 70 calculates the power flowing through each feeder and/or each transformer by reconciling hourly SCADA data at the substation with end user data (e.g., monthly utility bill data). In doing so, various profile parameters such as weather, revenue class, etc. are taken into account. Part of the modeling process is a data preparation subprocess 72 whereby various data is collected and prepared. Then, a model coefficient generation subprocess 74 uses the prepared data to generate a set of model coefficients for each end user meter. The model coefficients are used to estimate the power flow through particular feeders and/or distribution transformers on a certain date in the past, or used to predict the power flow under certain weather conditions. By calculating the power flowing through each distribution transformer, the modeling process 70 can forecast which transformers are likely to fail in the near future.

Reconciling SCADA data at the substation with end user data is challenging because most end user energy use data is available in many different billing formats (e.g., different start and end dates of a billing cycle), and because data often reside in different departments of a utility company in incompatible databases. The invention overcomes this challenge by carefully defining the scope of analysis, checking all collected data for error, and using a server system to provide the needed computing power, as described herein. The modeling process 70 includes a scope definition process 80, a data collection process 90, a data validation process 94, a model training process 100, a calibration process 110, and a model rendering process 120.

The scope definition process 80 entails determining the geographical and temporal boundaries for analysis. The geographical boundary, which is herein referred to as an "analysis region," includes at least a part of the service territory and may be defined in terms of a list of substations to be included in the analysis. From this list of substations, a list of distribution transformers to be modeled and the list of end users whose meter readings are to be used in the model are identified. In one embodiment, the temporal boundary, herein referred to as the "tuning period," is a 53-week tuning period whereby the end of this 53-week tuning period is as close to the present time as possible.

The data collection process 90 entails collecting data from various predetermined sources. For example, in the embodiment of FIG. 4, hourly data values are extracted from SCADA data for the tuning period for each feeder circuit emanating from each substation in the analysis region. SCADA, which stands for Supervisory Control And Data Acquisition, is a well known controller supervisory level controller and database that is used in power generation and distribution. The hourly data values may include current data (average or by phase), voltage data (average or by phase), and power factor or MVA. Further, as described above, distribution connectivity map is collected for the covered feeder circuit. The distribution connectivity map may include nameplate rating for each transformer in the circuit (e.g., in kVA), transformer type (underground, overhead, pad-mounted, etc.), phases, and switching device (e.g., tap) connectivity. Customer data, including customer profile data and usage data, are also collected from all available utility databases for the analysis region. This customer data may include, for example, revenue class information, street address and zip code, state plane coordinates or its equivalent, and meter information. The meter information may include one or more of rate code, transformer to which the meter is connected, history of kWh and kW (if available) values spanning the entire tuning period, and the history of kVAh and kVAr values, as available, for the entire tuning period.

Figure 6:
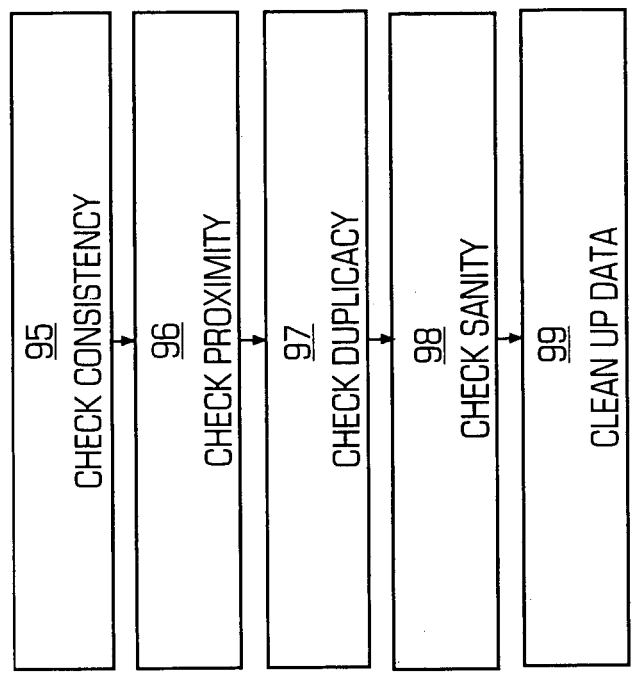
FIG. 6 is a flowchart showing an exemplary embodiment of the data validation process.

FIG. 6 is a flowchart depicting an example of the data validation process 94, which validates the data collected during the data collection process 90 by running a series of checks on the collected information. Preferably, the data validation process 94 is completed before the model training is performed to generate model coefficients. In the exemplary data validation process 94 shown in FIG. 6, the data validation process 94 includes a consistency check subprocess 95, a proximity check subprocess 96, a duplicacy check subprocess 97, a sanity check subprocess 98, and a VEE (validation, editing, and estimation) subprocess 99.

The consistency check subprocess 95 entails comparing distribution connectivity maps that are collected from different utility databases. As mentioned above, a transformer connectivity map provides a mapping between transformers, feeders, taps, and meters. When new meters are added (e.g., a new building is constructed) or removed, or when some transformers are temporarily out of service because of maintenance work, the transformer connectivity may be changed or adjusted (e.g., by using a tap). Due to the fact that not all the databases are immediately updated or updated accurately when changes and adjustments are made, there may be discrepancies about transformer connectivity among the databases. By comparing the data from various databases, the inaccurate connectivity information can be identified and ignored.

The collected data includes customer state plane coordinates (e.g., coordinates of the meters) and coordinates of the transformers. Typically, meters are located within an area of a given distance from the transformer. The proximity check subprocess 96 includes correlating customer state plane coordinates with those of the transformer that supports the specific customer and flagging the coordinates that appear too distant from the respective supporting transformer. For example, if meters are typically within two miles of the supporting transformers and a customer meter is indicated to be about 10 miles away from the supporting transformer, the database 60 marks the information as being probably erroneous.

The duplicacy check subprocess 97, as the name implies, investigates duplicate or inconsistent meter records. The duplicacy check subprocess is useful for identifying human errors, such as errors made in recording the transformer-meter connectivity in the first place or errors made in entering the records into the database. For example, if many transformers are indicated to support one meter, the information is marked.

The sanity check subprocess 98 compares the total annual end user energy by feeder circuit to the total annual energy as measured by SCADA data. Where the end user totals fall more than 10% short of SCADA totals, the sanity check module investigates the possibility of missing end user data, misassigned end users, or other possible reasons for the discrepancy. Any readings outside physically reasonable bounds or spikes that do not fit the general usage pattern are marked.

Once all the suspect data are marked, the VEE subprocess corrects or modifies the marked data by using VEE algorithms. The VEE subprocess 99 entails scanning all received energy data histories for gaps, duplicate readings, spikes, and other anomalous patterns, and corrects them. The VEE algorithm, or data cleanup algorithm, may be any of the currently known data cleanup algorithms. After these subprocesses are completed, the data is validated and ready for training. The checks are designed to identify and correct any human or mechanical errors (e.g., faulty equipment) from the data so that model coefficients will be based on accurate data. As long as this goal is achieved, the validation process 94 does not have to include the specific subprocesses described herein.

In order to supply virtual transformer meter readings, the system must first be trained with historic customer data, SCADA, and weather data. The model training process 100 (see FIG. 5) is conducted by regressing customer data in the model database (e.g., monthly kWh, load factor) and the loadshape library against environmental factors (e.g., temperature, season, weather, day-of-week, holiday). During the model training process 100, monthly transformer loads are correlated with interval and daily data that is indexed by profiling parameters such as revenue class, rate class, weather sensitivity, and load factor. Profiles are matched between customers, and monthly data are broken down into probabilistically high hourly data based on the profile matching.

Figure 7:
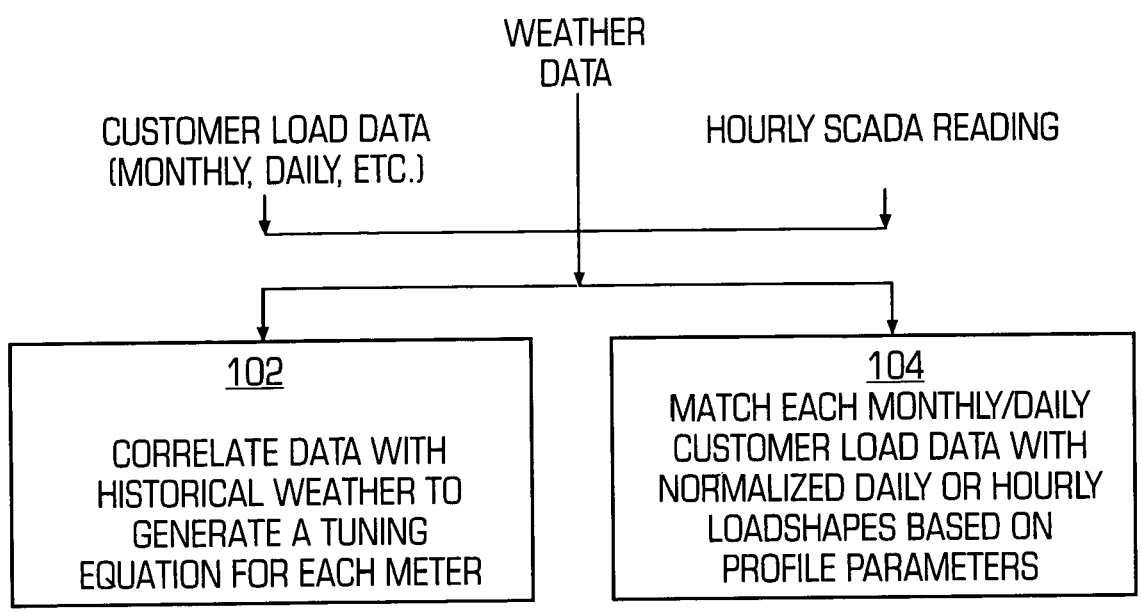
FIG. 7 is a flowchart showing an exemplary embodiment of the model training process.

FIG. 7 is a flowchart of an exemplary model training process 100. As shown, the model training process 100 may be subdivided into a data categorization process 102 and a loadshape creation process 104. In the categorization process 102, the customer load data, which are usually in the monthly format, are correlated with the historical weather data to generate one or more tuning equations for each meter. The tuning equation embodies weather sensitive uses (e.g., cooling and heating end uses) as well as the fraction of end uses that is not weather-sensitive. If the customer data is in a monthly billing period format, the tuning equation may act on the whole monthly billing period. On the other hand, if the customer data is in a daily or hourly format, the tuning equation may act on calendar weeks.

A tuning equation typically has the form $C_1(Days)+C_2(HDD_x)+C_3(CDD_y)$, wherein $C_1$, $C_2$, and $C_3$ are coefficients that are derived through a normalization process, "Days" is the number of days covered by the utility bill, and "HDD" and "CDD" represent the heating degree-days and cooling degree-days, respectively. The subscripts x and y indicate base temperatures, which are derived separately for each end user. Thus, in the exemplary tuning equation provided such as Energy=$(12)(Days)+(0.42)(HDD_{53})+(0.12)(CDD_{54})$, the base temperatures are 53° F. and 54° F., respectively, for heating and cooling.

The coefficients of the tuning equation and the two base temperatures are determined by a combination of ordinary least square regression and gradient-based optimization. For any set of heating and cooling base temperatures, an ordinary least square regression is used to find the optimal values of the other three coefficients. This process is repeated for multiple combinations of heating and cooling base temperatures, and stops after the tuning equation error is minimized. Both "ordinary least square regression" and "gradient-based optimization" are well known in statistics and in operations research.

In the loadshape creation process 104, the available hourly and daily data are normalized to take out their sensitivity to weather. More specifically, hourly data are normalized so as to remove scale (annual kWh), weather sensitivity, and day-type dependence. As for the daily data, they are similarly normalized to remove scale and weather sensitivity but not day-type dependence. Since some of the data are monthly, the number of hourly/daily normalized loadshapes is smaller than the number of meters from which customer data are collected. As for the monthly customer data, they are matched with one of the hourly and/or daily data based on their profiles. Each meter from which the customer data are obtained has a set of profiles and a set of model coefficients. The profiles indicate various information about the meter or the end user of the meter such as revenue class, rate class, weather sensitivity, and load factor. By matching these profiles, the processor 66 makes "the best guess" as to what a meter's daily and hourly load is like even though the only available information is a monthly bill.

At the end of the training process 100, the tuning equation that indicates the weather sensitivity for each meter in the analysis region is combined with a daily/hourly normalized loadshape from a peer customer with such data and selected on the basis of matching criteria described above. The tuning equations, the hourly normalized loadshapes, and the daily normalized loadshapes are stored in the loadshape library 62 in object form. The loadshape library 62 organizes both types of meters by 1) revenue class, 2) heating/cooling weather sensitivity and baseload fraction, 3) rate code, and 4) annual average of monthly loadfactor.

During the model calibration process 110, the loadshapes generated by model coefficients and aggregated to the level of feeders are compared to measured SCADA data for the same feeders and over the same time period. The calibration process 110 entails comparison of the calculated weekly energy totals with the energy totals based on SCADA data. Likewise, the calculated weekly average daily load factor is matched with the weekly average daily load factor based on SCADA data, and the calculated day-of-week and holiday distribution are matched with the day-of-week and holiday distribution pattern based on SCADA data. Calibration factors are derived from these comparisons. When the calibration factors are added to the model coefficient, the remaining discrepancy between the model and the actual SCADA data is eliminated.

Weekly energy totals calculated by the model may differ from weekly SCADA energy totals for reasons of temporary switching of some transformers to other feeders. Such events are usually clearly visible in that the discrepancy between model prediction and SCADA data is substantially different than the usual discrepancy which, in absence of such switching, tends to be similar from week to week. Calibration for such obvious switching events, which cannot be predicted and thus are not part of the model, is done using the average of non-switching weeks and not the value that it would have been on its own.

At the end of the model calibration process 110, there is a set of model coefficients assigned to each meter in the analysis region. The model coefficients take into account any seasonal or weather sensitivity, daily energy and load factors, and hourly normalized loadshapes for each meter. More specifically, the model coefficients for each meter reflects environmental sensitivity factors such as annual kWh, weather information, logical day indicator, etc. Further, the coefficients take into account weather sensitivity such as baseload data (e.g., % of annual kWh per day), cooling sensitivity, and heating sensitivity. The coefficients also indicate daily deviations (e.g., in % of annual kWh), daily load factor (e.g., a ratio), and hourly normalized loadshape. Thus, these model coefficients can be used to predict loads for changing weather and changing customer distributions.

The model calibration process 110 may involve an aggregation process to determine the transformer load or the feeder load. Determining the transformer load includes using the distribution connectivity map to identify the meters that are supplied by the transformer of interest, and summing the hourly loadshapes of each meter that is supplied by the transformer. The sum should be approximately equal to the load on the transformer. Similarly, determining the feeder load includes using the distribution connectivity map to identify the transformers that are supplied by the feeder of interest, and summing the loads on these transformers to approximate the load on the feeder. If the transformer/feeder happens to be one that takes actual measurements, the sum of the hourly loadshapes may be compared to the actual measurements for consistency. If the difference between the two values is large, adjustments are made to the loadshapes in a predetermined manner, sums of the transformer and feeder loadshapes are recalculated, and the sums are again compared to the measured values. This way, the loadshapes are iteratively adjusted until the sum of the loadshapes matches the measured value reasonably closely, and the sum of the hourly data matches any available weekly data.

The transformer loadshapes and the feeder loadshapes, which are generated by the aggregation process and calibrated, may be stored in the model database 63 (see FIG. 4). The model coefficients that are used to produce the transformer load shapes may also be stored in the model database 63. Once the model coefficients are stored in the model database 63, the model training process 100 is concluded.

The model rendering process 120 (see FIG. 5), which is usually done in response to a request from a client computer 56, uses the model coefficients to provide load data for a desired time range and coverage area within the training period and the analysis region, respectively. The model rendering process may also be used to predict transformer or feeder loads under different (e.g., hypothetical) weather conditions. Using the model coefficients, the model rendering process 120 forms a full hourly profile for the desired time range. The model rendering process 120 generates an individualized usage profile for each end user meter that is requested. Most end user meters are read at approximately monthly intervals, and are referred to as "monthly meters." Rendering an hourly profile for a monthly meter involves a combination of data items to construct a fully formed hourly profile. The data items may include 1) revenue class, 2) rate code, 3) weather sensitivity, 4) baseload fraction, 5) scale, 6) average annual loadfactor (if available) of the monthly meter, 7) normalized values of matched hourly item from loadshape library, 8) normalized values of matched daily item from loadshape library, and/or 9) daily weather for the desired period, either historic or forecast. Monthly bills from an end user meter are regressed against cooling and heating degree-days computed in suitably chosen, meter-specific, base temperatures.

To render the hourly loadshape of a distribution transformer, each monthly meter connected to the transformer is rendered as an hourly profile, as described above. During the model rendering process 120, the resulting hourly profiles are aggregated hour-by-hour, and yield a combined transformer load profile of hourly kWh values for the desired time period. A similar process is executed to render a feeder circuit, whereby all transformers that are connected to a particular feeder circuit are rendered and their profiles aggregated hour-by-hour to yield a combined feeder profile of hourly kWh values for a desired time period.

If feeder loads are requested, feeders are modeled by aggregating transformer loads, energy losses, and non-accounted energy. The losses and non-accounted energy include line losses, transformer losses, and unmetered end uses that can occur between customer meter and feeder. The nonaccounted energy is determined by comparing, on a feeder-by-feeder basis, SCADA data of feeder energy to rendered transformer energy. There is likely to be a difference between the hourly profile rendered for an entire feeder circuit from the aggregation of its constituent customer meters and the hourly SCADA data values measured for the same time period. The model calibration process 110 is a correction process that is used to compensate for some of this difference. One obvious source is energy that is not accounted for, such as line losses, transformer losses, and unmetered end uses that can occur between customer meter and the feeder circuit. Such nonaccounted energy is determined by comparing the SCADA data of feeder energy to rendered transformer energy on a feeder-by-feeder basis. Other reasons for the difference include differences in daily load factor (ratio of daily average to daily peak kWh value) as well as the timing of the daily peak and the pattern of hourly variation before and after the peak.

The result that is obtained by aggregation, however, may be different from what is obtained based on the SCADA data. Calibration reduces the impact of this difference between the aggregated feeder circuit profile and the SCADA data. This reduction is achieved by aggregating both rendered and measured hourly feeder circuit data one week at a time and computing an effective weekly loss factor. The weekly loss factor is computed by dividing the observed total weekly difference by the measured total weekly feeder value. After the computed weekly loss factors are included, the rendered daily average and peak kWh values are compared to the measured daily averages and peaks. Percentage differences are calculated based on this comparison, and used to generate a discrepancy pattern. A typical discrepancy pattern may be, for example, "rendered loadfactor is too low by 7%." A person of ordinary skill in the art will understand that this method of determining the weekly loss factor can be adapted to evaluate hourly discrepancy patterns, if desired.

The calculated discrepancy patterns in daily average and peak kWh are used to modify the selection of daily library items used to render customer meters on this feeder. The library items that tend to exacerbate the observed discrepancy patterns are dropped in favor of other library items that better conform to the pattern, to reduce any discrepancy. This rendering of the feeder hourly profile is repeated after daily library items have been re-selected, and revised discrepancy patterns are determined. The process is repeated until the discrepancies are small enough to be satisfactory.

Other discrepancies may be observed, such as differences in daily load factor (ratio of daily average to daily peak kWh value) as well as the timing of the daily peak, and the pattern of hourly variation before and after the peak.

Figures 8A, 8B:
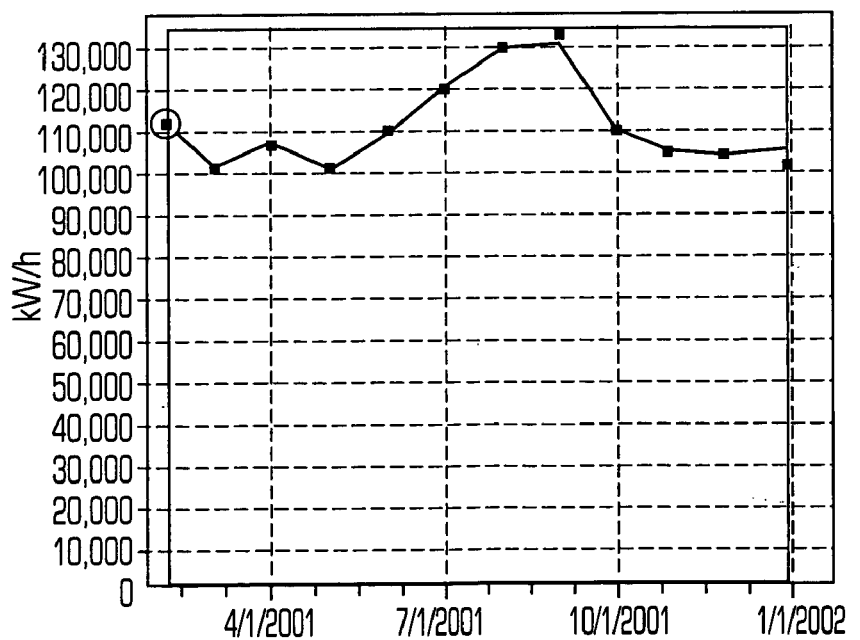
FIGS. 8A, 8B, 8C, 8D, and 8E are graphical representations of different stages of the model rendering process.
Figure 8C:
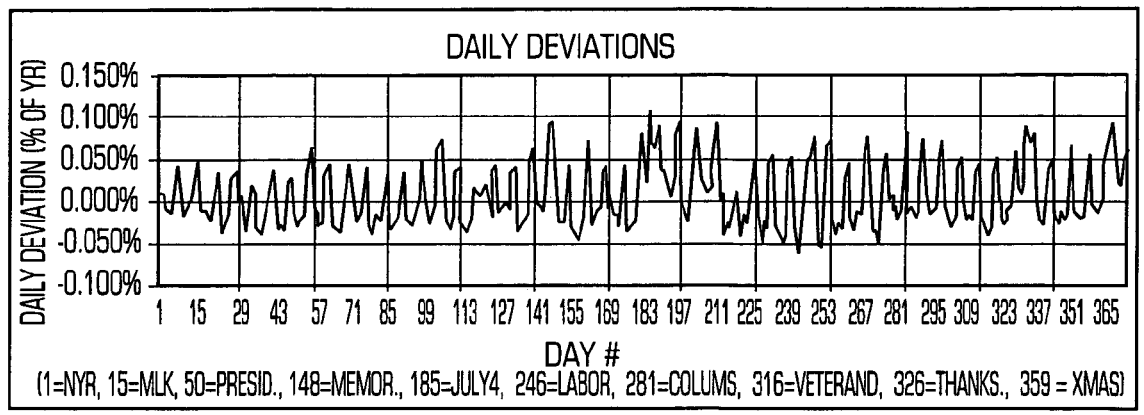
Figure 8D:
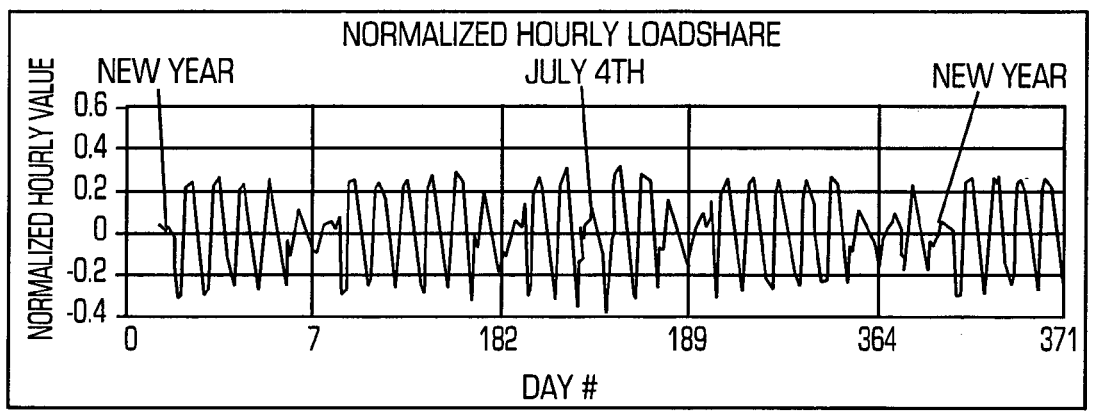
Figure 8E:
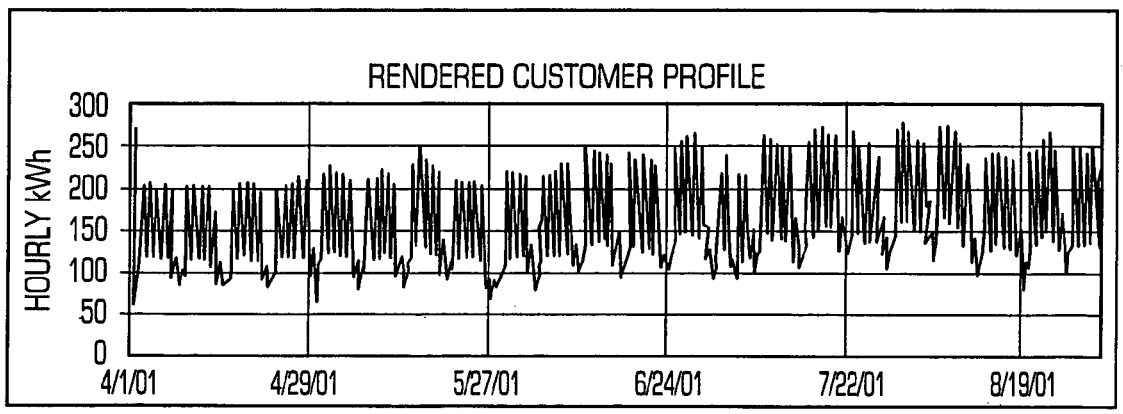

FIG. 8A through FIG. 8E graphically show different stages of the model rendering process 120. FIG. 8A is a monthly meter report showing a particular end user's energy usage per month in kWh. FIG. 8B is a plot showing the fit between the monthly bills of FIG. 8A and a tuning equation, indicating the weather sensitivity of the meter. The particular tuning equation used for the graph is shown near the bottom of the graph. FIG. 8C is a plot of daily deviations, read from a meter and FIG. 8D is a plot of normalized hourly loadshape. It is assumed that the meters from which the data of FIG. 8A, FIG. 8B, FIG. 8C, and FIG. 8D are obtained have matching profile values. The data of FIG. 8B, FIG. 8C, and FIG. 8D are therefore combined to generate the "customer profile" shown in FIG. 8E, which applies to an end user whose profiles match the profiles of FIG. 8B, FIG. 8C, and FIG. 8D. For the meters that are read daily, only a matching one of hourly item from the database 60 is required to combine with the daily values to yield the fully formed hourly profile. For meters that are read hourly, the model rendering process 120 consists of retrieving the actual measured hourly values.

Each feeder has the following set of channels: average current (Amp), apparent power (MVA), power (MW), reactive power (MVAR), and power factor (PF). Where channels for three phases are measured, the following additional set of channels is present: Phase A current (AmpA), phase B current (AmpB), phase C current (AmpC), neutral current (AmpN), and imbalance current (AmpI). Where channels are missing, well-known power engineering formulas may be used to calculate the missing value.

The modeling process 70 provides many applicational benefits. For example, the accuracy of planning and protection coordination studies may be increased by loading transformer loads into circuit planning models. Furthermore, the currently used transformer, circuit, and device loading reports can be significantly improved with this modeling process. These reports are used to prioritize transformer replacements and circuit analysis, size protection devices, and management reporting. Also, the modeling process provides a system-wide and consistent transformer, feeder and bank utilization reporting capability for management reporting and analysis. In addition, the modeling process provides analysis support for operations by loading transformer loads into the outage management system. Overall, the invention significantly improves the accuracy and depth of area, substation, and circuit load growth studies by using base load trending with weather risk analysis.

The reports that may be generated using the invention can be divided, generally, into three categories. The first category includes on-line ad hoc reports from a standard set of user configurable statistical and energy reports. These on-line and ad hoc reports provide users flexibility in analyzing various aspects of power distribution, such as 1) checking the average profile for a circuit against the peak to understand how that circuit's loading changes during a peak, or 2) evaluating the hourly load at protection devices when switching for a planned outage. The second category of reports includes predefined system- and area-wide reports such as substation bank, feeder and distribution bank loading, overloading, utilization, and load factor distribution. The third category includes custom reports and extracts to other applications such as circuit planning tools and outage management systems.

External estimate of growth patterns over time by revenue class or geographic area may be input to the system, which then assesses the impact on transformers, feeders, and or the entire system.

FIG. 9A is an exemplary transformer load report generated by the model rendering process 120 described above. The particular report shows detailed profile information and raw data, as well as the percentage of the maximum load that the transformer is designed to handle (see rightmost column). The report shows, for example, that Transformer M708 L02 was overloaded in June 2002. A user of the client computer 56 (see FIG. 3) may change the format to view a list of only the overloaded transformers. FIG. 9B, for example, shows a report where the last column is an average amount of overload each respective transformer had to bear, and the only transformers that appear on the list are the ones whose average overload values are greater than zero. FIG. 9C shows yet another report format about transformer usage. The bar graph shows a general load distribution on a group of transformers.

Figure 10C:
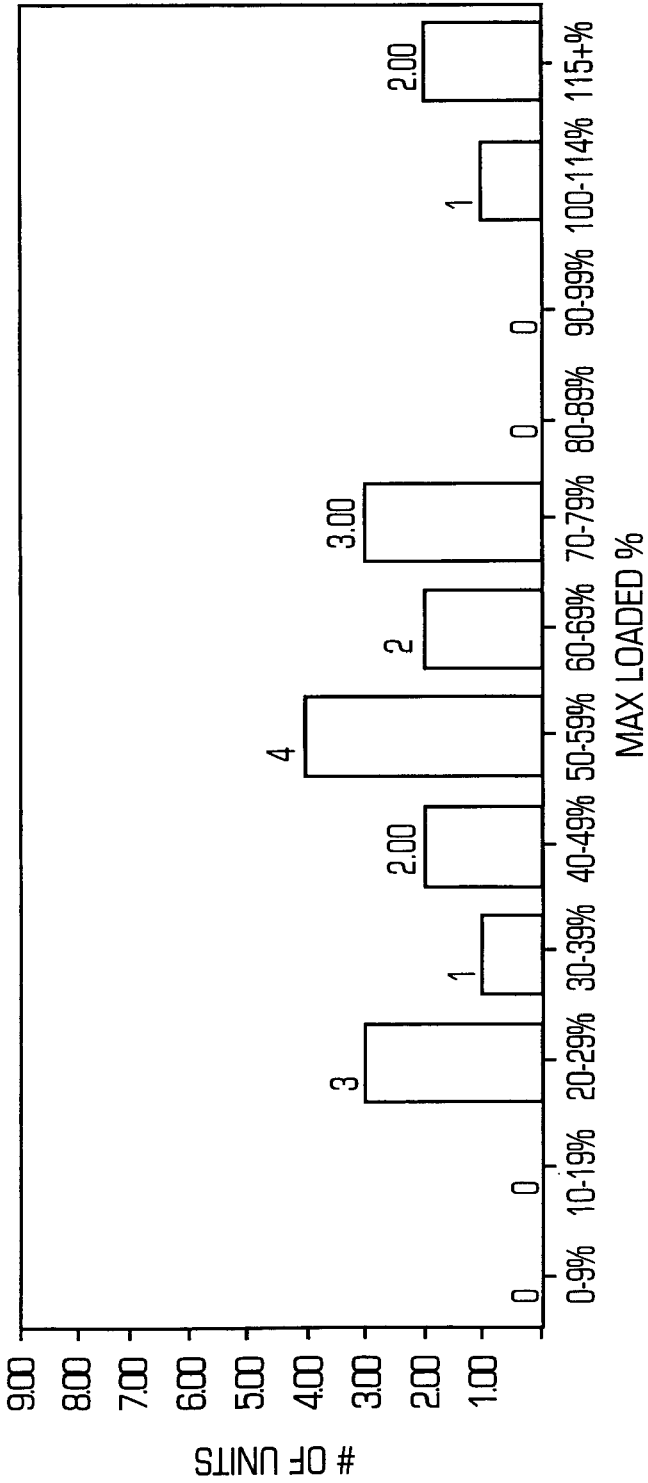

FIGS. 10A, 10B, and 10C are exemplary reports about the loads on one or more feeders in the system. The reports are in formats that correspond to FIG. 9A, FIG. 9B, and FIG. 9C described above. Various other report formats are available, and can be customized for each utility provider.

The modeling process of the invention may be used for:
  checking the average profile for a circuit against the peak to understand how that circuit's loading changes during a peak.
  checking the summer weekday load duration curve on a substation's transformer bank for peak shaving or load shifting opportunities.
  obtaining a daily load profile report, which charts average and actual 24-hour load profiles for a single meter or an aggregate of meters. The daily load profile report provides the date of the monthly peak day, the time, and load factor for a selected time period.
  obtaining a multi-trend report, which shows transformer loading as a function of a selected variable (e.g., weather, temperature).

Gaining knowledge of hourly loading on each distribution transformer, and other distribution assets, has a number of operational and strategic advantages including the following:
  "Hot spots" in distribution systems can be identified and alleviated before a power outage occurs;
  The effect of unusually severe weather on the distribution system can be evaluated in advance by the prediction capability of the modeling process;
  Short-term weather forecasts can be fed to the model to obtain a realistic prediction of loads by feeders;
  Year-to-year load growth or load decrease observed system-wide or at individual substations can be analyzed to determine the relative impact of weather or customer changes in causing the load growth or decrease;
  Conversely, by applying expected growth rates by revenue class and region, load growth on individual parts of the distribution system can be accurately forecast.

The invention has been described using variations and examples to enable one skilled in the art to develop an understanding of the invention. Numerous variations will be obvious and as such, one skilled in the art should reference the claims of the invention rather than the foregoing examples to assess rights entitled to with respect to the claims. For example, although the training process 100 is described as using the regression method, the training process 100 may be training of a neural net if neural nets are used.

What is claimed is:

1. A method of determining an energy load on a power distribution component, the method comprising:
  collecting meter data for a group of meters, wherein some of the meter data is in an hourly format and some of the meter data is in a monthly format;
  collecting weather data;
  correlating the meter data with the weather data to generate tuning equations, wherein each of the tuning equations is associated with at least one of the meters and indicates a weather sensitivity of the associated meter;
  normalizing the meter data in the hourly format to generate normalized hourly loadshapes that are independent of weather conditions and weekly variations;
  combining the tuning equations and the normalized hourly loadshapes to generate a set of model coefficients for each of the meters, wherein the set of model coefficients reflects weather conditions and weekly variations for one of the meters; and storing the model coefficients so that the model coefficients are retrievable to determine the power load on a power distribution component.

2. The method of claim 1 further comprising selecting the group of meters by:
determining a geographical boundary; and
identifying meters that are located within the geographical boundary.

3. The method of claim 1, wherein the meter data comprises daily power usage data of the meters.

4. The method of claim 1 further comprising validating the collected meter data.

5. The method of claim 4, wherein validating the collected meter data comprises modifying or disregarding values that deviate from a general pattern.

6. The method of claim 4, wherein the validating comprises eliminating duplicate entries.

7. The method of claim 4, wherein the validating comprises checking consistency between data obtained from different sources.

8. The method of claim 1, wherein a first one of the meters has a first profile and generates meter data in an hourly format and a second one of the meters has a second profile and generates meter data in a monthly format, wherein the combining of the tuning equations and the normalized hourly loadshapes comprises matching the first profile and the second profile.

9. The method of claim 8, wherein one of the normalized hourly loadshapes is based on the meter data from the first one of the meters, further comprising assigning the one normalized hourly loadshape to the second one of the meters based on the matching of the first profile and the second profile.

10. The method of claim 1, wherein the model coefficients indicate a meter's revenue class, rate class, weather sensitivity, and loadfactor.

11. The method of claim 1 further comprising obtaining a distribution connectivity map that shows power line connectivity among meters, transformers, feeders, and substations.

12. The method of claim 1 further comprising:
determining which subgroup of meters are supplied by the distribution component; and
summing the hourly normalized loadshapes associated with each of the subgroup of meters to determine the energy load on the distribution component.

13. The method of claim 12, wherein the distribution component is a transformer and the energy load on the distribution component is an hourly normalized transformer loadshape, further comprising summing a plurality of hourly normalized transformer loadshapes including the hourly normalized transformer loadshape to determine a feeder circuit loadshape.

14. The method of claim 1, wherein the distribution component is a transformer, the method further comprising:
calculating a first weekly value by summing the hourly normalized meter loadshapes of a subgroup of meters;
calculating a second weekly value by summing hourly meter data obtained from a public database;
determining a difference between the first weekly value and the second weekly value; and
adjusting one or more of the hourly normalized loadshapes if the difference is greater than a first predetermined value.

15. The method of claim 14 further comprising generating an hourly transformer loadshape using the hourly normalized meter loadshapes.

16. The method of claim 15 further comprising determining the energy load on a feeder circuit that supplies power to the transformer, the method further comprising:
determining which subgroup of transformers receive power from the feeder circuit;
calculating a third weekly value by summing hourly normalized transformer loadshapes;
calculating a fourth weekly value by summing hourly transformer data obtained from a public database;
determining a difference between the third weekly value and the fourth weekly value; and
adjusting one or more of the hourly normalized transformer loadshapes if the difference is greater than a second predetermined value.

17. The method of claim 16 further comprising computing an effective loss factor to account for part of the difference between the third weekly value and the fourth weekly value.

18. The method of claim 17 further comprising generating an hourly normalized feeder loadshape based on the hourly transformer loadshapes and the effective loss factor.

19. The method of claim 16, wherein the computing of the effective loss factor comprises dividing the third weekly value by the fourth weekly value.

20. The method of claim 1 further comprising:
receiving a weather condition; and
generating a meter loadshape for a particular meter under the weather condition by using the model coefficients, wherein the meter loadshape is useful for determining a power load on the particular meter under the weather condition.

21. The method of claim 20 further comprising:
generating loadshapes for a plurality of meters under the weather condition, the plurality of meters including the particular meter; and
aggregating the loadshapes for the plurality of meters to generate a transformer loadshape for a transformer that supplies energy to the plurality of meters.

22. The method of claim 21, wherein the transformer loadshape is one of a plurality of transformer loadshapes determined by aggregating meter loadshapes, further comprising aggregating the transformer loadshapes to generate a feeder circuit loadshape for a feeder circuit that supplies power to the plurality of transformers whose loadshapes are aggregated.

23. The method of claim 20 further comprising receiving a date in the past and using the date to receive the weather condition.

24. The method of claim 20 further comprising generating a report in response to a request by using the meter loadshapes.

25. The method of claim 1 further comprising storing the normalized hourly loadshapes and the set of model coefficients.

26. A computer-readable memory system to instruct a computer to function in a specified manner, the memory comprising:
instructions to collect meter data and weather data for a group of meters;
instructions to correlate the meter data with the weather data to generate tuning equations, wherein each of the tuning equations is associated with at least one meter and indicates a weather sensitivity of the meter;
instructions to normalize the meter data to generate normalized hourly loadshapes that are independent of weather conditions and weekly variations; and instructions to combine the tuning equations and the normalized hourly loadshapes to generate a set of model coefficients for the meter, wherein the set of model coefficients reflects weather conditions and weekly variations for the meter; and instructions to store the model coefficients so that the model coefficients are retrievable to determine the power load on a power distribution component.

27. The memory system of claim 26 further comprising instructions to generate a report by using the model coefficients in response to a client request.

28. The memory system of claim 26 further comprising instructions to store the normalized hourly loadshapes, wherein the instructions to store the model coefficients comprises instructions to store the model coefficients in a separate database than the normalized hourly loadshapes.

29. The memory system of claim 26 further comprising instructions to select the group of meters by determining a geographical boundary and identifying meters that are located within the geographical boundary.

30. The memory system of claim 26 further comprising instructions to validate the meter data.

31. The memory system of claim 30, wherein the instructions to validate the meter data comprises instructions to modify or disregard values that deviate from a general pattern.

32. The memory system of claim 30, wherein the instructions to validate the meter data comprises instructions to eliminate duplicate entries.

33. The memory system of claim 30, wherein the instructions to validate the meter data comprises instructions to check consistency between data from different sources.

34. The memory system of claim 26, wherein the instructions to combine the tuning equations and the normalized hourly loadshapes comprise instructions to match a first set of profile values that is associated with the tuning equations with a second set of profile values that is associated with hourly meter data from which the normalized hourly loadshapes are derived.

35. The memory system of claim 26, wherein the instructions to combine the tuning equations and the normalized hourly loadshapes comprise instructions to assign one of the normalized hourly loadshapes to each one of the meters by matching profile values that are associated with the normalized hourly loadshapes with profile values of each of the meters.

36. The memory system of claim 26, wherein the model coefficients indicate a meter's revenue class, rate class, weather sensitivity, and loadfactor.

37. The memory system of claim 26 further comprising instructions to obtain a distribution connectivity map that shows power line connectivity among meters, transformers, feeders, and substations.

38. The memory system of claim 26 further comprising:
instructions to determine which subgroup of meters are supplied energy by the distribution component; and
instructions to sum the hourly normalized loadshapes associated with each of the subgroup of meters to determine the energy load on the distribution component.

39. The memory system of claim 38, wherein the distribution component is a transformer and the energy load on the distribution component is an hourly normalized transformer loadshape, further comprising instructions to sum a plurality of hourly normalized transformer loadshapes including the hourly normalized transformer loadshape to determine a feeder circuit loadshape.

40. The memory system of claim 26, wherein the distribution component is a transformer, the memory further comprising:

instructions to calculate a first weekly value by summing the hourly normalized meter loadshapes of a subgroup of meters;
instructions to calculate a second weekly value by summing hourly meter data obtained from a public database;
instructions to determine a difference between the first weekly value and the second weekly value; and
instructions to adjust one or more of the hourly normalized loadshapes if the difference is greater than a first predetermined value.

41. The memory system of claim 40 further comprising generating an hourly transformer loadshape using the hourly normalized meter loadshapes.

42. The memory system of claim 41 further comprising:
instructions to determine the energy load on a feeder circuit that supplies power to the transformer;
instructions to determine which subgroup of transformers receive power from the feeder circuit;
instructions to calculate a third weekly value by summing hourly normalized transformer loadshapes;
instructions to calculate a fourth weekly value by summing hourly transformer data obtained from a public database;
instructions to determine a difference between the third weekly value and the fourth weekly value; and
instructions to adjust one or more of the hourly normalized transformer loadshapes if the difference is greater than a second predetermined value.

43. The memory system of claim 42 further comprising instructions to compute an effective loss factor to account for part of the difference between the third weekly value and the fourth weekly value.

44. The method system of claim 43 further comprising instructions to generate an hourly normalized feeder loadshape based on the hourly transformer loadshapes and the effective loss factor.

45. The memory system of claim 42, wherein the computing of the effective loss factor comprises dividing the third weekly value by the fourth weekly value.

46. The memory system of claim 26 further comprising:
instructions to receive a weather condition; and
instructions to generate a meter loadshape for a particular meter under the weather condition by using the model coefficients, wherein the meter loadshape is useful for determining a power load on the particular meter under the weather condition.

47. The memory system of claim 46 further comprising:
generating loadshapes for a plurality of meters under the weather condition, the plurality of meters including the particular meter; and
aggregating the loadshapes for the plurality of meters to generate a transformer loadshape for a transformer that supplies energy to the plurality of meters.

48. The memory system of claim 47, wherein the transformer loadshape is one of a plurality of transformer loadshapes determined by aggregating meter loadshapes, further comprising instructions to aggregate the transformer loadshapes to generate a feeder circuit loadshape for a feeder circuit that supplies power to the plurality of transformers whose loadshapes are aggregated.

49. The memory system of claim 46 further comprising:
instructions to receive a date in the past; and
instructions to use the date to receive the weather condition.

50. The memory system of claim 26 further comprising instructions to store the normalized hourly loadshapes and the set of model coefficients.

* * * * *